United States Patent [19]

Muller et al.

[11] 4,038,247

[45] * July 26, 1977

[54] STABILIZING POLYOLEFINS WITH DIACYL DIHYDRAZIDES

[75] Inventors: Helmut Muller, Binningen; Siegfried Rosenberger, Riehen; Heimo Brunetti, Reinach, all of Switzerland

[73] Assignee: Ciba-Geigy Corporation, Ardsley, N.Y.

[ * ] Notice: The portion of the term of this patent subsequent to May 22, 1990, has been disclaimed.

[21] Appl. No.: 586,835

[22] Filed: June 13, 1975

Related U.S. Application Data

[63] Continuation-in-part of Ser. No. 359,587, May 11, 1973, Pat. No. 3,894,990, which is a continuation of Ser. No. 141,027, May 6, 1971, Pat. No. 3,734,885.

[30] Foreign Application Priority Data

May 19, 1970 Switzerland .......................... 7371/70

[51] Int. Cl.$^2$ .............................................. C08K 5/25
[52] U.S. Cl. .............................................. 260/45.9 NC
[58] Field of Search ................................. 260/45.9 NC

[56] References Cited

U.S. PATENT DOCUMENTS

| | | | |
|---|---|---|---|
| 3,181,971 | 5/1965 | Rayner | 260/45.9 NC |
| 3,484,285 | 12/1969 | Hansen | 260/45.9 NC |
| 3,549,572 | 12/1970 | Minagawa et al. | 260/45.9 NC |
| 3,734,885 | 5/1973 | Muller et al. | 260/45.9 NC |
| 3,772,245 | 11/1973 | Dexter | 260/45.9 NC |
| 3,894,990 | 7/1975 | Muller et al. | 260/45.9 NC |

*Primary Examiner*—V. P. Hoke
*Attorney, Agent, or Firm*—Nestor W. Shust; Charles W. Vanecek

[57] ABSTRACT

A process for stabilizing homo- or copolymeric polyolefins, especially polypropylene, with certain symmetrical or asymmetrical diacyl dihydrazides is disclosed, said diacyl dihydrazides possessing good color properties, and said process being particularly advantageous with respect to thermooxidative decomposition in the presence of transition metals.

8 Claims, No Drawings

STABILIZING POLYOLEFINS WITH DIACYL DIHYDRAZIDES

This application is a continuation-in-part of copending application Ser. No. 359,587, filed May 11, 1973, now U.S. Pat. No. 3,894,990 which again is a continuation of application Ser. No. 141,027, filed May 6, 1971, now U.S. Pat. No. 3,734,885.

The object of the present invention is a process for stabilising homo- or copolymeric polyolefins by the use of diacyldihydrazides.

By virtue of their physical and electrical properties, polyolefins, especially polypropylene, are very suitable as insulation material in electrical engineering, particularly for the sheathing and coating of copper wires, copper cables, and other electrically conducting materials made from copper. Unfortunately, however the stated good properties of polyolefins are spoilt in that the polyolefins undergo, when in contact with transition metals, especially copper and its compounds, an oxidative decomposition catalysed by these metals. Copper additions of below 1%, for example, already lead to a lowering of the oxidation stability of polypropylene by the factor ~ 100.

Already known for the stabilisation of polyolefins against the harmful effect of transition metals are various acylation products from dicarboxylic acids and nitrogen bases, such as, e.g. amides of oxalic acid, especially oxanilides, as well as dihydrazides of various dicarboxylic acids.

All these compounds have certain technical disadvantages. On the one hand, their effectiveness is under no circumstances sufficiently high to completely prevent the damaging effect of the transistion metal. On the other hand, the polyolefin becomes discoloured in a harmful manner either at the time these compounds are being worked in or when the polyolefin is exposed to thermooxidative ageing conditions. It is this latter disadvantage in particular which occurs in the case of another known class of effective dicarboxylic acid dihydrazide derivatives, i.e. in the case of bis-arylidenedicarboxylic acid dihydrazides. These do indeed have a satisfactory deactivator-effect, but are already in themselves yellow coloured compounds. None of the types of compounds which have become known combines within itself the technically desired optimum stabilisation effect with colourlessness under working conditions.

Surprisingly, it has now been found that compounds of formula I

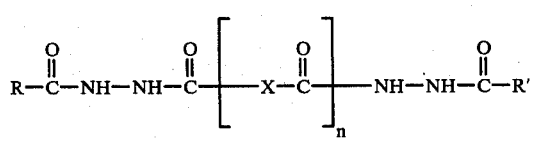

(I)

wherein R and R' independently of each other represent alkyl having from 1 to 17 carbon atoms, cyclohexyl, aralkyl which can be substituted by one or two alkyl groups having each from 1 to 4 carbon atoms and/or a hydroxyl group, phenyl, chlorophenyl, dichlorophenyl, phenyl which can be substituted by one or two alkyl groups having each from 1 to 4 carbon atoms and/or a hydroxyl group, alkylphenyl having from 7 to 14 carbon atoms, alkoxyphenyl having from 7 to 24 carbon atoms or naphthyl, X represents the direct bond, an alkylene radical having from 2 to 8 carbon atoms, a phenylene radical or a naphthylene radical, and n represents 0 or 1, are very suitable for the stabilisation of homo- or copolymeric polyolefins, especially with respect to thermooxidative decomposition in the presence of transition metals; and that these compounds at the same time possess good colour properties.

The compounds usable according to the invention are not only excellent stabilisers, which in their effectiveness clearly surpass the above described classes of compounds, but also have the advantage of colourlessness. This renders possible their incorporation into polyolefins without these thereby becoming harmfully discoloured. Furthermore, all the above mentioned previously known compounds have the property of having a discolouring effect in polyolefins under aging conditions, whilst the compounds usable according to the invention thereby produce no discolouration, which constitutes a great technical advantage with regard to long-duration stabilisation. Moreover, in some cases compounds usable according to the invention afford increased thermostability in polyolefins even in the absence of heavy metals.

R and R', respectively, represent in formula I, e.g. an alkyl group having from 1 to 17 carbon atoms, such as methyl, ethyl, propyl, butyl, pentyl, hexyl, iso-heptyl, octyl, decyl, undecyl, dodecyl, tetradecyl, or heptadecyl; or an alkylphenyl group having from 7 to 14 carbon atoms such as, e.g. phenyl which is substituted by methyl, tert.butyl, or tert.octyl groups; or an alkoxyphenyl group having from 7 to 24 carbon atoms such as, e.g. phenyl which is substituted by methoxy, propoxy, butoxy, hexoxy, octoxy, decyloxy, dodecyloxy, tetradecyloxy or octadecyloxy.

Examples of aralkyl or phenyl radicals represented by R and R', respectively, which radicals can be substituted by one or two alkyl groups having each from 1 to 4 carbon atoms and/or a hydroxyl group are: the 4-hydroxy-2-phenylethyl, 4-hydroxyphenyl, 3-tert.butyl-4-hydroxy-β-phenylethyl, 3-methyl-4-hydroxyphenyl, 2-hydroxy-3,5-di-tert.butyl-phenyl and 3,5-di-isopropyl-4-hydroxy-β-phenylethyl radical, more especially, however, the 3,5-di-tert.butyl-4-hydroxy-β-phenylethyl and 3,5-di-ter.butyl-4-hydroxyphenyl radical.

When X in Formula I represents an alkylene radical having from 2 to 8 carbon atoms, this can be, e.g. ethylene, propylene, butylene, pentylene, hexylene, or octylene. X however can also represent a phenylene radical such a the 1,3- or 1,4-phenylene radical, or a naphthylene radical such as the 2,6- or 1,4-naphthylene radical.

Preferred asymmetrical compounds of Formula I are those wherein R and R' independently of each other represent alkyl having from 1 to 8 carbon atoms, cyclohexyl, benzyl, 3,5-di-tert.butyl-4-hydroxy-β-phenylethyl, 3,5-di-tert.butyl-4-hydroxyphenyl, phenyl, chlorophenyl, dichlorophenyl, alkylphenyl having 7 or 8 carbon atoms, alkoxyphenyl having 7 or 8 carbon atoms or naphthyl, and X represents the direct bond.

Preferred symmetrical compounds of Formula I are compounds in which R and R' are identical and each represents alkyl having from 1 to 12 carbon atoms, cyclohexyl, benzyl, hydroxy-β-phenylethyl or hydroxyphenyl di-substituted by alkyl having from 1 to 4 carbon atoms, phenyl, chlorophenyl, dichlorophenyl, alkylphenyl having from 7 to 12 carbon atoms, alkoxyphenyl having from 7 to 12 carbon atoms or naphthyl, and X represents the direct bond.

In this first preferred group of symmetrical compounds of Formula I, those which have particularly good stabilisation properties are the compounds in which R and R' are identical and each represents alkyl having from 2 to 8 carbon atoms, cyclohexyl, benzyl, 3,5-di-tert.butyl-4-hydroxy-β-phenylethyl, 3,4-di-tert.butyl-4-hydroxyphenyl, phenyl, chlorophenyl, dichlorophenyl, alkylphenyl having 7 or 8 carbon atoms, alkoxyphenyl having 7 or 8 carbon atoms or naphthyl, and X represents the direct bond.

A second preferred group of symmetrical compounds usable according to the invention are the compounds in which R and R' are identical and each represents alkyl having from 1 to 12 carbon atoms, cyclohexyl, benzyl, hydroxy-β-phenylethyl or hydroxyphenyl di-substituted by alkyl having from 1 to 4 carbon atoms, phenyl, chlorophenyl, dichlorophenyl, alkylphenyl having from 7 to 12 carbon atoms, alkoxyphenyl having from 7 to 12 carbon atoms or naphthyl, and X represents an alkylene radical having from 2 to 8 carbon atoms.

In this second preferred group of symmetrical compounds of Formula I, those which have particularly good stabilisation properties are the compounds in which R and R' are identical and each represents alkyl having from 1 to 4 carbon atoms, phenyl, chlorophenyl, dichlorophenyl, alkylphenyl having 7 or 8 carbon atoms, alkoxyphenyl having 7 or 8 carbon atoms or naphthyl, and X represents an alkylene radical having from 2 to 8 carbon atoms.

A third preferred group of symmetrical compounds of Formula I are the compounds in which R and R' are identical and each represents alkyl having from 2 to 17 carbon atoms, cyclohexyl, benzyl, hydroxy-β-phenylethyl or hydroxyphenyl di-substituted by alkyl having from 1 to 4 carbon atoms, phenyl, chlorophenyl, dichlorophenyl, alkylphenyl having from 7 to 14 carbon atoms, alkoxyphenyl having from 7 to 18 carbon atoms or naphthyl, and X represents phenylene or naphthylene.

In this third preferred group of symmetrical compounds of Formula I, those which have particularly good stabilisation properties are the compounds in which R and R' are identical and each represents alkyl having from 2 to 17 carbon atoms, cyclohexyl, alkylphenyl having from 10 to 14 carbon atoms or alkoxyphenyl having from 10 to 14 carbon atoms, and X represents phenylene or naphthylene.

Especially good stabilisation properties are possessed, for example, by the following compounds of Formula I:
N,N'-di-propionyloxalic acid dihydrazide,
N,N'-dibutyroyloxalic acid dihydrazide,
N,N'-di-pelargonyloxalic acid dihydrazide,
N,N'-di-cyclohexanoyloxalic acid dihydrazide,
N,N'-di-phenylacetyloxalic acid dihydrazide,
N,N'-di-benzoyloxalic acid dihydrazide,
N,N'-di-α-naphthoyloxalic acid dihydrazide,
N,N'-di-o-toluoyloxalic acid dihydrazide,
N,N'-di-p-methoxybenzoyloxalic acid dihydrazide,
N,N'-di-caproyloxalic acid dihydrazide,
N,N'-di-capryloyloxalic acid dihydrazide,
N,N'-di-acetylsuccinic acid dihydrazide,
N,N'-di-acetyladipic acid dihydrazide,
N,N'-di-propionyladipic acid dihydrazide,
N,N'-di-acetylsebacic acid dihydrazide,
N,N'-di-benzoylsebacic acid dihydrazide,
N,N'-di-β-naphthoylsebacic acid dihydrazide,
N,N'-di-propionylterephthalic acid dihydrazide,
N,N'-di-pelargonylterephthalic acid dihydrazide,
N,N'-di-2-ethylhexanoylterephthalic acid dihydrazide,
N,N'-di-lauroylterephthalic acid dihydrazide,
N,N'-di-stearoylterephthalic acid dihydrazide,
N,N'-di-p-(tert.octyl)-benzoylterephthalic acid dihydrazide,
N,N'-di-p-(octoxy)-benzoylterephthalic acid dihydrazide,
N,N'-di-tridecanoylterephthalic acid dihydrazide,
N,N'-di-palmitoylterephthalic acid dihydrazide,
N,N'-di-valeroylterephthalic acid dihydrazide,
N,N'-di-butyroylisophthalic acid dihydrazide,
N,N'-di-pelargonylisophthalic acid dihydrazide,
N,N'-di-cyclohexanoylisophthalic acid dihydrazide,
N,N'-di-2-chlorobenzoyloxalic acid dihydrazide,
N,N'-bis-2,4-dichlorobenzoylsebacic acid dihydrazide,
N-benzoyl-N'-butyroyloxalic acid dihydrazide,
N-benzoyl-N'-pelargonyloxalic acid dihydrazide,
N,N'-bis-(3,5-di-tert.butyl-4-hydroxybenzoyl)-oxalic acid dihydrazide, and
N,N-bis-[3-(3,5-di-tert.butyl-4-hydroxyphenyl)-propionyl]-adipic acid dihydrazide.

Polyolefins are protected by compounds of Formula I against decomposition, preferably α-olefin-polymers such as polypropylene, optionally cross-linked polyethylene, polyisobutylene, polymethylbutene-1, polymethylpentene-1, polybutene-1, polyisoprene, polybutadiene; copolymers of monomers on which the mentioned homopolymers are based, such as ethylene-propylenecopolymers, propylene-butene-1-copolymers, propyleneisobutylene-copolymers, styrene-butadiene-copolymers, as well as terpolymers of ethylene and propylene with a diene such as, e.g. hexadiene, dicyclopentadiene or ethylidenenorbornene; mixtures of the above mentioned homopolymers such as, e.g. mixtures of polypropylene and polyethylene, polypropylene and poly-butene-1, polypropylene and polyisobutylene. Thereby preferred are polypropylene as well as its mixtures, and the copolymers containing propylene units.

The compounds of Formula I are usually incorporated into the substrates in a concentration of from 0.01 to 5 percent by weight, calculated on the material to be stabilised.

Preferably, an amount of from 0.05 to 1.5 percent by weight, especially preferred from 0.01 to 0.8 percent by weight, of the compounds, calculated on the material to be stabilised, is incorporated into this material.

The incorporation can be effected after polymerisation, e.g. by the mixing in of at least one of the compounds of formula I and, optionally, further additives into the melt by methods common in practice, before or during shaping; or by application of the dissolved or dispersed compounds to the polymer, optionally with subsequent evaporation of the solvent.

In the case of cross-linked polyethylene, the compounds are added before cross-linking.

Further additives together with which the stabilisers usable according to the invention can be used are as follows:

1. Antioxidants of the amino- and hydroxyaryl series. To be mentioned in the case of the latter are the sterically hindered phenol compounds, e.g.
2,2'-thiobis-(4-methyl-6-tert.butylphenol),
4,4'-thiobis-(3-methyl-6-tert.butylphenol),
2,2'-methylene-bis-(4-methyl-6-tert.butylphenol),
2,2'-methylene-bis-(4-ethyl-6-tert.butylphenol), 4,4'-methylene-bis-(2-methyl-6-tert.butylphenol),
4,4'-butylidine-bis-(3-methyl-6-tert.butylphenol),
2,2'-methylene-bis-[4-methyl-6-(α-methylcyclohexyl)-phenol],
2,6-di-(2-hydroxy-3-tert.butyl-5-methylbenzyl)-4-methylphenol,
2,6-di-tert.butyl-4-methylphenol,
1,1,3-tris- 2-methyl-(4-hydroxy-5-tert. butylphenyl)-butane,
1,3,5-trimethyl-2,4,6-tri-(3,5-di-tert.butyl-4-hydroxybenzyl)-benzene,
esters of β-4-hydroxy-3,5-di-tert.butylphenyl-propionic acid with mono- or polyvalent alcohols such as methanol, ethanol, octadecanol, hexanediol, nonanediol, thiodiethyleneglycol, trimethylolethane, or pentaerythrite,
2,4-bis-octylmercapto-6-(4-hydroxy-3,5-di-tert.butylanilino)-s-triazine,
2,4-bis-(4-hydroxy-3,5-di-tert.butylphenoxy)-6-octylmercapto-s-triazine,
1,1-bis-(4-hydroxy-2-methyl-5-tert.butylphenyl)-3-dodecylmercaptobutane,
4-hydroxy-3,5-di-tert.butylbenzyl-phosphonic acid ester, such as dimethyl, diethyl, or dioctadecyl ester,
(3-methyl-4-hydroxy-5-tert.butylbenzyl)-malonic acid dioctadecyl ester,
s-(3,5-dimethyl-4-hydroxyphenyl)-thioglycolic acid octadecyl ester,
esters of bis-(3,5-di-tert.butyl-4-hydroxybenzyl)-malonic acid such as didodecyl ester, dioctadecyl ester, 2-dodecylmercaptoethyl ester.

Of the aminoaryl derivatives are to be mentioned aniline and naphthylamine derivatives, as well as their heterocyclic derivatives, e.g.
phenyl-1-naphthylamine,
phenyl-2-naphthylamine,
N,N'-diphenyl-p-phenylenediamine,
N,N'-di-2-naphthyl-p-phenylenediamine,
N,N'-di-sec.butyl-p-phenylenediamine,
6-ethoxy-2,2,4-trimethyl-1,2-dihydroquinoline,
6-dodecyl-2,2,4-trimethyl-1,2-dihydroquinoline,
mono- and dioctyliminodibenzyl,
polymerised 2,2,4-trimethyl-1,2-dihydroquinoline,
whereby though with the combined use of compounds of Formula I with the above mentioned amine compounds the stabilised polymer no longer possesses, on account of the discolouration tendency of the said amine compounds, such good colour properties.

2. UV-absorbers and protective agents against light rays, such as
a. 2-(2'-hydroxyphenyl)-benzotriazoles, e.g. the 5'-methyl,
3',5'-di-tert.butyl, 5'-tert.butyl, 5-chloro-3',
5'-di-tert.butyl, 5-chloro-3'-tert.butyl-5'-methyl,
3',5'-di-tert,amyl, 3'-methyl-5'-β-carbomethoxyethyl,
5-chloro-3',5'-di-tert.amyl derivative,
b. 2,4-bis-(2'-hydroxyphenyl-6-alkyl-s-triazine, e.g. the 6-ethyl or 6-undecyl derivative,
c. 2-hydroxybenzophenones, e.g. the 4-hydroxy, 4-methoxy, 4-octoxy, 4-decycloxy, 4-dodecyloxy, 4,2',4'-tri-hydroxy, or 2'-hydroxy-4,4'-dimethoxy derivative,
d. 1,3-bis-(2'-hydroxybenzoyl)-benzenes, e.g.
1,3-bis-(2'-hydroxy-4'-hexyloxybenzoyl)-benzene,
1,3-bis-(2'-hydroxy-4'-octoxybenzoyl)-benzene,
1,3-bis(2'-hydroxy-4'-dodecyloxybenzoyl)-benzene.
e. Aryl esters of optionally substituted benzoic acids, such as, e.g.
phenylsalicylate, octylphenylsalicyclate, benzoylresorcin, dibenzoylresorcin, 3,5-di-tert.butyl-4-hydroxybenzoic acid-2,4,-di-tert.butylphenyl ester or -octadecyl ester.
f. Acrylates, e.g.
α-cyano-β,β-diphenylacrylic acid ethyl ester or isooctyl ester, α-carbomethoxycinnamic acid methyl ester,
α-cyanoβ-methyl-p-methoxycinnamic acid methyl or butyl ester, N-(β-carbomethoxyvinyl)-2-methylindoline.
g. Nickel compounds, e.g.
nickel complexes of 2,2'- thiobis-(4-tert.octylphenol), such as the 1:1- and 1:2-complex, optionally with other ligands such as n-butylamine,
nickel complexes of bis-(4-tert.octylphenyl)-sulphone, such as the 2:1-complex, optionally with other ligands such as 2-ethylcapronic acid,
nickel dibutyldithiocarbamate, nickel salts of 4-hydroxy-3,5-di-tert.butylbenzylphosphonic acid monoalkyl esters, such as methyl, ethyl, or butyl ester,
the nickel complex of 2-hydroxy-4-methyl-phenylundecyl ketone oxime.
h. Oxalic acid diamides, e.g.
4,4'-di-octyloxyoxanilide,
2,2'-di-octyloxy-5,5'-di-tert.butyloxanilide,
2,2'-di-dodecyloxy-5,5'-di-tert.butyloxanilide.
3. Phosphites, such as
triphenylphosphite,
diphenylalkylphosphites,
phenyldialkylphosphites,
trinonylphenylphosphite,
trilaurylphosphite,
trioctadecylphosphite,
3,9-di-isodecyloxy-2,4,8,10-tetraoxa-3,9-diphosphaspiro-(5,5)-undecane,
tri-(4-hydroxy-3,5-di-tert.butylphenyl)-phosphite.
4. Nucleation agents, such as
4-tert.butylbenzoic acid, adipic acid, diphenylacetic acid.
5. Peroxide-decomposing compounds, such as
esters of β-thiodipropionic acid, e.g. lauryl,
stearyl, myristyl or tridecyl ester.
Salts of 2-mercaptobenzimidazoles, e.g. the zinc salt,
diphenylthiourea.
6. Other additives such as softeners, antistatica, fireproofing agents, pigments, soot, asbestos, glass fibers, kaolin, talcum.

In the case of using the stabilisers according to the invention in combination with phenolic antioxidants, particularly good stabilising effects are obtained when at the same time are used peroxide-decomposing compounds such as higher alkyl esters of thiopropionic acid, since these peroxide-decomposing compounds exhibit synergism not only, as is known, with the phenolic antioxidants but additionally with the stabilisers of Formula I.

The production of the symmetrical compounds usable according to the invention can be effected, in particular, by two reaction sequences known per se:
a. Double acylation of a dicarboxylic acid hydrazide with the usual acylation agents, e.g. monocarboxylic acid chlorides or monocarboxylic acid anhydrides; or b. Reaction of two moles of a monocarboxylic acid hydrazide with one mole of a reactive derivative of a dicarboxylic acid, e.g. dicarboxylic acid diester or a dicarboxylic acid dichloride.

The production of asymmetrical compounds of Formula I is advantageously carried out by reacting in a manner known per se, a dicarboxylic acid ester chloride with a monocarboxylic acid hydrazide to obtain the corresponding dicarboxylic acid monoester acyl hydrazide, reacting the latter with hydrazine to form the mono-acylated dicarboxylic acid di-hydrazide and subsequently N-acylating the reaction product with a monocarboxylic acid chloride or a monocarboxylic acid anhydride.

The polyolefins stabilised by the addition of the compounds usable according to the invention are especially suitable as coating material for copper wires and cables, but also for other types of metal coating, as well as for the production of shaped articles such as films, threads, sheets, tubes, injection-moulded articles, etc.. They can also be mixed with copper or with copper-containing pigments.

The invention is further illustrated in the following examples.

EXAMPLE 1

CH$_3$CONHNHCO(CH$_2$)$_4$CONHNHCOCH$_3$

An amount of 17.4 g (0.1 mol) of adipic acid dihydrazide is suspended in 100 ml of dimethylacetamide. The suspension is heated to 100° C, and to it are added, with stirring, 20.4 g (0.2 mol) of acetic anhydride, the addition being made at such a rate that the charge is maintained at 100° C purely by the heat of reaction, without additional heating. The cheese-like white suspension is heated for a further 2 hours to 100° C, then cooled, filtered off under suction, and the residue washed with alcohol.

The thus obtained N,N'-di-acetyladipic acid dihydrazide (stabiliser 1) melts, after drying, at 256°–259° C, and can be recrystallised from dimethylacetamide.

If, in the above Example, the acetic anhydride is replaced by propionic acid anhydride, then is obtained, with otherwise an analogous procedure, N,N'-dipropionyladipic acid dihydrazide (stabiliser 2), M.P. 260°–265° C (recrystallisation from dimethylformamide).

If, in the present Example, the acetic anhydride is replaced by phenylacetic acid chloride, then is obtained, with otherwise an analogous procedure, N,N'-diphenylacetyl-adipic acid dihydrazide, M.P. 310°–316° C (stabiliser 3) (recrystallisation from dimethylformamide).

If the acetic anhyrdride is replaced by stearic acid chloride, then is obtained, with an analogous procedure, N,N'-di-stearoyladipic acid dihydrazide (stabiliser 4), M.P. 244°–246° C.

If the acetic anhydride is replaced by o-toluic acid chloride or p-methoxybenzyl chloride, then is obtained, with otherwise the same procedure, N,N'-di-o-toluoyl-adipic acid dihydrazide (stabiliser 5) with softening point above 200° C, or N,N'-di-p-methoxybenzoyl-adipic acid dihydrazide (stabiliser 6) with softening point above 210° C.

EXAMPLE 2

An amount of 11.8 g (0.1 mol) of oxalic acid dihydrazide is suspended in 120 ml of dimethylacetamide; to the suspension are then added dropwise at 15° C, with stirring, 15.7 g (0.2 mol) of acetyl chloride. The reaction mixture is stirred at room temperature for a further half hour, the powdery white precipitate isolated, and well washed with water. For purification, the product is washed with acetonitrile.

Thus obtained is N,N'-diacetyloxalic acid bishydrazide (stabiliser 7), M.P. 285°–287° C.

If, in the present Example, the acetyl chloride is replaced by one of the acid chlorides given in the following Table 1, then are obtained, with otherwise an analogous procedure, the corresponding N,N'-diacyloxalic acid dihydrazides having the following melting points:

Table 1

| Acid chloride R CO Cl | M.P. of the obtained diacyloxalic acid-bis-hydrazide of the formula RCONHNHCOCONHNHCOR (° C) | Recrystallised from | Stabiliser |
|---|---|---|---|
| C$_2$H$_5$COCl | 266° | | 8 |
| n-C$_3$H$_7$COCl | ca. 276° with decomposition | ethylene glycol monomethyl ether | 9 |
| n-C$_8$H$_{17}$COCl | 250° | " | 10 |
| n-C$_4$H$_9$—CH—COCl<br>         \|<br>         C$_2$H$_5$ | 215 – 218° | dimethylformamide | 11 |
| n-C$_{17}$H$_{35}$-COCl | 212 – 215° | | 12 |
| C$_6$H$_5$-COCl | about 260° with decomposition | | 13 |
| 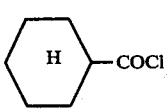 | ca. 280° | ethylene glycol monomethyl ether | 14 |
| 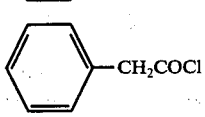 | >350° | dimethylacetamide | 15 |

Table 1-continued

| Acid chloride R CO Cl | M.P. of the obtained diacyloxalic acid-bis-hydrazide of the formula RCONHNHCOCONHNHCOR (° C) | Recrystallised from | Stabiliser |
|---|---|---|---|
| 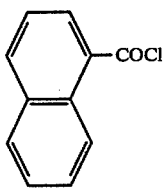 | 295 – 298° | ethylene glycol monomethyl ether | 16 |
| $C_{11}H_{23}COCl$ | softening point > 200° | | 17 |

EXAMPLE 3

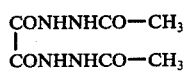

An amount of 11.8 g (0.1 mol) of oxalic acid dihydrazide is suspended in 120 ml of dimethylacetamide; to the suspension are then added, with stirring, 25.5 g (0.25 mol) of acetic anhydride, and the whole is heated for 2 hours to 50° C.

The white crystalline precipitate is isolated, washed first with water and then with ethanol, and dried.

Thus obtained is a product, M.P. 284°–286° C, identical to the N,N'-diacetyloxalic acid dihydrazide described in Example 2 (stabiliser 7).

EXAMPLE 4

14.6 g (0.1 mol) of oxalic acid diethyl ester and 16.3 g (0.22 mol) of acethydrazide are refluxed in 130 ml of dimethylacetamide for 5 hours. After cooling, the white crystalline precipitate is isolated, washed with water and afterwards with alcohol, and dried.

Thus obtained is a product, M.P. 284°–287° C, identical to the N,N'-diacetyloxalic acid dihydrazide described in Example 2 (stabiliser 7).

EXAMPLE 5

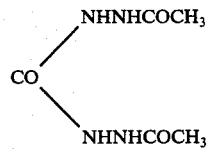

An amount of 9.0 g (0.1 mol) of carbohydrazide is suspended in 90 ml of dimethylacetamide; to the suspension are then added within 30 minutes, with stirring, 25.5 g (0.25 mol) of acetic anhydride. The reaction temperature thereby rises from 20° to 40° C, and a solution is formed. The mixture is stirred for 4 hours without heating, then concentrated in vacuo, and the residue washed with a little water. The white crystalline product is isolated, and recrystallised from ethanol. The thus obtained N,N'-diacetyl-carbohydrazide (stabiliser 18) melts at 222°–226° C.

EXAMPLE 6

$CH_3CONHNHCOCH_2CH_2CONHNHCOCH_3$

An amount of 14.6 g (0.1 mol) of succinic acid dihydrazide is suspended in 130 ml of dimethylacetamide; to the suspension are then added, with stirring, 20.4 g (0.2 mol) of acetic anhydride. The reaction is exothermic. The reaction mixture heats up from 20° to ca. 40° C, and a thick crystal mass is formed. After a further hour of reaction time at 50° C, the white crystalline product is isolated from the mother liquor, and washed with ethylene glycol monomethyl ether. The thus obtained N,N'-diacetylsuccinic acid dihydrazide (stabiliser 19) melts at 254°–255° C.

EXAMPLE 7

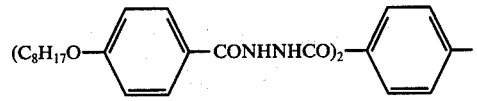

An amount of 26.4 g (0.1 mol) of p-n-octoxy-benzohydrazide is suspended in 200 ml of dimethylacetamide, to the suspension are then added within 20 minutes, with stirring, 10.2 g (0.05 mol) of terephthalic acid dichloride. The reaction mixture thereby heats up to ca. 35° C. The charge is thereupon stirred for 90 minutes at 65° C, then cooled, filtered off under suction, and the suction-filter residue recrystallised from dimethylformamide.

The thus obtained N,N'-di-p-n-octoxybenzoyl-terephthalic acid dihydrazide (stabiliser 20) melts at 310°–316° C.

EXAMPLE 8

$(C_{17}H_{35}CONHNHCO)_2-(CH_2)_2-$

An amount of 14.6 g (0.1 mol) of succinic acid hydrazide is suspended in 200 ml of dimethylacetamide; to the suspension are then added, with stirring, 66.7 g (0.22 mol) of stearic acid chloride. The temperature of the reaction mixture thereby rises to about 45° C, and the suspension becomes voluminous. The charge is maintained for a further 3 hours at 60° C, then cooled, and the microcrystalline precipitate isolated. For purification, the product is boiled with 500 ml of ethanol. After isolation and drying is obtained a white powder of N,N'-di-stearoyl-succinic acid dihydrazide (stabiliser 21), M.P. 248°–252° C.

EXAMPLE 9

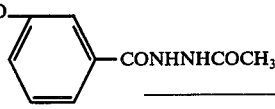

An amount of 19.4 g (0.1 mol) of isophthalic acid dihydrazide is suspended in 200 ml of dimethylacetamide; to the suspension are added within 20 minutes, with stirring, 16.4 g (0.21 mol) of acetyl chloride. The temperature of the reaction mixture thereby rises to ca. 40° C, and a practically clear solution is formed. The charge is stirred for a further 3 hours at room temperature, and subsequently poured into 1000 ml of water, whereby the reaction product is obtained as a white pulverulent precipitate. For purification, the thus obtained N,N'-diacetylisophthalic acid dihydrazide (stabiliser 22) is recrystallised from ethanol, M.P. 264° C.

If, in the present Example, the acetyl chloride is replaced by pelargonic acid chloride, then is obtained, with otherwise the same procedure, N,N'-dipelargonylisophthalic acid dihydrazide (stabiliser 23), M.P. 218° C.

If, in the present Example, the acetyl chloride is replaced by benzoyl chloride, then is obtained N,N'-dibenzoylisophthalic acid dihydrazide (stabiliser 24), M.P. 297°– 299° C.

EXAMPLE 10

$CH_3CONHNHCO(CH_2)_8CONHNHCOCH_3$

An amount of 23 g (0.1 mol) of sebacic acid dihydrazide is suspended in 200 ml of dimethylacetamide; to the suspension are then added in 30 minutes, with stirring, 16.4 g (0.21 mol) of acetyl chloride. The temperature of the reaction mixture thereby rises to about 45° C. The white crystalline suspension is stirred for a further 3 hours at room temperature; the solid substance is then isolated, and recrystallised from dimethylacetamide.

The thus obtained N,N'-diacetylsebacic acid dihydrazide (stabiliser 25) melts at 238° C.

If the acetyl chloride is replaced by an equivalent amount of one of the acid chlorides listed in the following Table 2, then are obtained the corresponding N,N'-diacylsebacic acid dihydrazides having the given melting point.

Table 2

| Acid chloride (R—COCl) | Melting point of the obtained diacylsebacic acid dihydrazide of the formula R—CONHNHCO—(CH$_2$)$_8$—CONHNHCO—R | Stabiliser No. |
|---|---|---|
| $C_2H_5COCl$ | ~230° C | 26 |
| $C_6H_5COCl$ | 202 – 204° C | 27 |
| 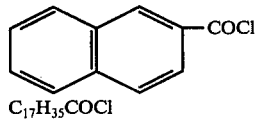 | 240 – 242° C | 28 |
| $C_{17}H_{35}COCl$ | 226° C | 29 |

EXAMPLE 11

An amount of 19.4 g (0.1 mol) of terephthalic acid dihydrazide is suspended in 200 ml of dimethylacetamide; to the suspension are then added, within 20 minutes, 37.0 g (0.21 mol) of pelargonic acid chloride. The temperature of the reaction mixture thereby rises to ca. 40° C, and a voluminous-crystalline suspension is formed. The charge is stirred for a further 3 hours at room temperature, and subsequently poured into 100 ml of water. The white pulverulent precipitate is isolated, dried, and recrystallised from a little dimethylformamide. The thus obtained N,N'-dipelargonylterephthalic acid dihydrazide (stabiliser 30) has a melting point of 276° C.

If, in the present Example, the perlargonic acid chloride is replaced by one of the acid chlorides shown in the following Table 3, the procedure being otherwise analogous, then are obtained the corresponding N,N'-diacrylterephthalic acid dihydrazides having the given M.P.

Table 3

| Acid chloride RCOCl | Diacylterephthalic acid dihydrazide RCONHNHCO—⟨⟩—CONHNHCOR M.P. | Recrystallised from | Stabiliser No. |
|---|---|---|---|
| $C_2H_5$—COCl | 278 – 280° C | | 31 |
| n—$C_4H_9$—CH—COCl<br>\|<br>$C_2H_5$ | 285° C | dimethylformamide | 32 |
| n—$C_{17}H_{35}$—COCl | 248 – 252° C | dimethylformamide | 33 |

If, in the present Example, the terephthalic acid dihydrazide is replaced by naphthalene-2,6-dicarboxylic acid dihydrazide, then is obtained N,N'-dipelargonyl-naphthalene-2,6-dicarboxylic acid dihydrazide (stabiliser 34), which has a softening point of above 300° C.

EXAMPLE 12

The diacyl dicarboxylic acid dihydrazides listed in the following Table 4 are prepared according to the procedure described in the Examples mentioned in column 4 of said Table 4:

Table 4

$$R-\overset{O}{\underset{\|}{C}}-NH-NH-\overset{O}{\underset{\|}{C}}-X-\overset{O}{\underset{\|}{C}}-NH-NH-\overset{O}{\underset{\|}{C}}-R$$

| R | X | Melting point | Prepared according to Example | Stabiliser No. |
|---|---|---|---|---|
| 4-methylphenyl | —(CH$_2$)$_4$— | 250° C | 1 | 35 |
| 4-hexadecyloxyphenyl (H$_{33}$C$_{16}$O—C$_6$H$_4$—) | —(CH$_2$)$_4$— | 228° C | 1 | 36 |
| 4-octadecyloxyphenyl (H$_{37}$C$_{18}$O—C$_6$H$_4$—) | phenylene | 258° C | 7 | 37 |
| C$_4$H$_9$—CH(C$_2$H$_5$)— | —C(CH$_3$)$_2$—CH$_2$—C(CH$_3$)$_2$—CH$_2$— | 120° C | 10 | 38 |
| 4-octyloxyphenyl (H$_{17}$C$_8$O—C$_6$H$_4$—) | —C(CH$_3$)$_2$—CH$_2$—C(CH$_3$)$_2$—CH$_2$— | 184° C | 10 | 39 |
| 2-chlorophenyl | direct bond | 250° C | 2 | 40 |
| 2,4-dichlorophenyl | direct bond | 272° C | 2 | 41 |
| 2-chlorophenyl | —(CH$_2$)$_8$— | 246° C | 10 | 42 |
| 2,4-dichlorophenyl | —(CH$_2$)$_8$— | 266° C | 10 | 43 |

EXAMPLE 13

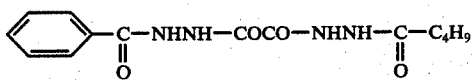

a. 13.6 g (0.1 mol) of benzanhydride are dissolved in 70 ml of dimethylacetamide. The resultant solution is cooled to 0° C and then 10.0 g (0.1 mol) of triethylamine are added thereto. Subsequently 15.0 g (0.11 mols) of oxalic acid monoethylester chloride are added dropwise. The mixture is stirred at 50° C for 2 hours, then cooled and admixed with 500 ml of water. After filtering and drying there is obtained N-benzoyloxalic acid monoethylester hydrazide, M.P. 132° C.

b. 11.8 g (0.05 mols) of N-benzoyloxalic acid monoethylester hydrazide are dissolved in 100 ml of alcohol and 5.0 g (0.1 mol) of hydrazine hydrate are added thereto. The N-benzoyloxalic acid dihydrazide formed is sucked off, washed with alcohol and dried, M.P. 226° C.

c. 11.1 g (0.05 mols) of N-benzoyloxalic acid dihydrazide are suspended in 250 ml of dimethylacetamide and dropwise admixed, while stirring, with 5.8 g (0.055 mols) of butyric acid chloride. The reaction mixture is stirred for 3 hours at 60°–70° C, then 500 ml of ice water are added and filtering under suction is carried out at 5°–10° C. The resultant product is recrystallised from methylcellosolve. There is obtained N-benzoyl-N'-butyroyloxalic acid dihydrazide (stabiliser 44), M.P. 254° C.

EXAMPLE 14

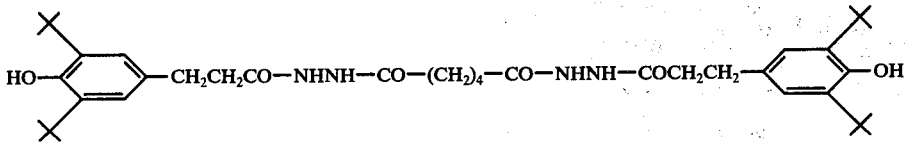

68 g of 3-(3,5-di-tert.butyl-4-hydroxyphenyl)-propionic acid hydrazide are suspended in 300 ml of dimethylacetamide and then admixed, while stirring, within 20 minutes with 21.3 g of adipic acid dichloride. The mixture is then stirred for another hour at 70° C, admixed with 1000 ml of water and filtered. The reaction product can also be purified by dissolving it in methanol, followed by carefully precipitation with water. The bis-[3-(3,5-di-tert.butyl-4-hydroxyphenyl)-propionyl]-adipic acid dihydrazide thus obtained (stabiliser 45) melts at 240° C.

If, in the above Example, the adipic acid dichloride is replaced by an equivalent amount of one of the dicarboxylic acid dichlorides given in the following Table 5, the procedure being otherwise the same, then the corresponding bis-[3-(3,5-di-tert.butyl-4-hydroxyphenyl)-propionyl]-dicarboxylic acid dihydrazides are obtained, the melting points of which are indicated in column 3 of said Table.

Table 5

| Dicarboxylic acid dichloride | Stabiliser No. | Melting point |
|---|---|---|
| 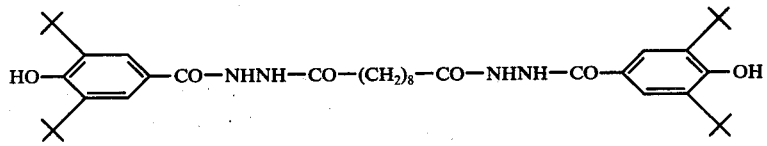 | 46 | 258–259° C |
| 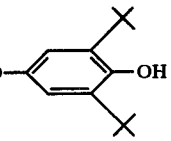 | 47 | 130° C |

EXAMPLE 15

23 g (0.1 mol) of sebacic acid dihydrazide are suspended in 200 ml of dimethylacetamide. While stirring, 53.6 g (0.2 mols) of 3,5-di-tert.butyl-4-hydroxybenzoyl chloride are added in portions. The mixture is then heated to 80° during 2 hours, cooled and poured into 1 liter of ice water. The solid which precipitates is filtered off and recrystallised from dimethylacetamide. There is obtained bis-(3,5-di-tert.butyl-4-hydroxybenzoyl)-sebacic acid dihydrazide (Stabiliser 48), M.P. 285° C.

If in the above Example the sebacic acid dihydrazide is replaced by an equivalent amount of lxalic acid dihydrazide, the procedure being otherwise the same, then is obtainedbis-(3,5-di-tert.butyl-4-hydroxybenzoyl)-oxalic acid dihydrazide (Stabiliser 49), M.P. 302°–304° C.

The prior known metal-deactivators for polyolefins shown in the following Table 6 were tested, as comparison compounds, in the following test Examples:

Table 6

| Stabiliser No. | Chemical designation |
|---|---|
| 50 | oxanilide |
| 51 | oxalic acid dihydrazide |
| 52 | carbohydrazide |
| 53 | malonic acid dihydrazide |
| 54 | adipic acid dihydrazide |
| 55 | terephthalic acid dihydrazide |
| 56 | N,N,'-diphenylsuccinic acid dihydrazide |
| 57 | N,N,'-diphenylsebacic acid dihydrazide |

EXAMPLE 16 a. Preparation of the test samples. 100 parts of polypropylene (melt index 3.2 g/10 min., 230° C/2160 g) are intensively mixed together in a shaking apparatus, for 10 minutes, with 0.1 parts of β-(3,5-di-t.butyl-4-hydroxyphenyl)-propionic acid octadecyl ester, 0.3 parts of dilaurylthiodipropionate and 0.5 parts of one of the additives listed in the following Table 7.

The obtained mixture is kneaded in a Brabender Plastograph at 200° C for 10 minutes; to the mixture is then added 1.0 per cent by weight of powdered copper (electrolytically produced, Merck), and the whole intensively mixed at the same temperature for a further 2 minutes. The thus produced mass is subsequently pressed in a platen press at 260° C platen temperature to form 1 mm thick plates, from which are then stamped strips 1 cm wide and 17 cm in length.

the heat-stabilised test samples required for comparison purposes, without or with copper addition but without metal-deactivator, are prepared in an analogous manner.

b. Testing

The testing for effectiveness of the metal-deactivators added to the copper-containing test strips is carried out by heat ageing in an air-circulation furnace at 149° C, and the results are compared with results obtained on test strips not containing copper. For this purpose are used in each case 3 test strips of each formulation. The commencing, easily visible decomposition of the test strip is taken as being the end point for each test.

The preservation factor given in the 4th column of Table 7 is defined as follows:

$$\text{Preservation factor} = \frac{\text{days until decomposition, with copper}}{\text{days until decomposition, without copper}} \times 100$$

Table 7

| Stabiliser No. | Days until decomposition without Cu | Days until decomposition with Cu | Preservation factor |
|---|---|---|---|
| without additive | 18–27 | <1 | <1 |
| 1 | 26 | 21 | 81 |
| 2 | 25 | 22 | 88 |
| 8 | 34 | 18 | 53 |
| 9 | 29 | 27 | 93 |
| 10 | 27 | 26 | 96 |
| 13 | 18 | 19 | 105 |
| 14 | 29 | 29 | 100 |
| 15 | 29 | 23 | 79 |
| 16 | 24 | 14 | 58 |
| 19 | 40 | 26 | 65 |
| 23 | 24 | 15 | 63 |
| 28 | 23 | 18 | 78 |
| 30 | 27 | 24 | 89 |
| 31 | 29 | 22 | 76 |
| 33 | 18 | 18 | 100 |
| 40 | 21 | 19 | 91 |
| 41 | 25 | 21 | 84 |
| 42 | 26 | 18 | 69 |
| 43 | 23 | 15 | 65 |
| 44 | 25 | 24 | 95 |
| 49 | 23 | 23 | 100 |
| Comparison products | | | |
| 50 | 18 | 1 | 6 |
| 51 | 24 | 6 | 25 |
| 54 | 18 | 2 | 11 |
| 55 | 25 | 2 | 8 |
| 56 | 21 | 1 | 5 |
| 57 | 25 | 14 | 56 |

EXAMPLE 17 a. Preparation of the test samples. 100 parts of polypropylene (melt index 3.2 g/10 min., 230° C/2160 g) are intensively mixed together, in a shaking apparatus, for 10 minutes, with 0.1 parts of β-(3,5-di-t.butyl-4-hydroxyphenyl)-propionic acid octadecyl ester, 0.3 parts of dilaurylthiodipropionate and 0.5 parts of an additive listed in the following Table 8.

The obtained mixture is kneaded in a Brabender Plastograph at 200° C for 10 minutes, and to the mixture is then added 1.0 per cent by weight of powdered copper (electrolytically produced, Merck), and the whole intensively mixed at the same temperature for a further 2 minutes. The thus obtained mass is subsequently pressed in a platen press at 260° C platen-temperature to form 1 mm thick plates, from which are stamped, with the aid of a stamping tool, strips having a width of 1 cm and a length of 17 cm.

The heat-stabilised test samples required for comparison purposes, without copper addition or with copper addition, but without metal-deactivator, are prepared in an analogous manner.

b. Testing

The testing for effectiveness of the metal-deactivators added to the copper-containing test strips is carried out by heat ageing in an air-circulation furnace at 135° C, and the results are then compared with results obtained from test strips not containing copper. The commencing, easily visible decomposition of the test strip is taken as being the end point for each test.

The preservation factor shown in column 4 of Table 8 is defined as follows:

Preservation factor = $\frac{\text{days until decomposition, with copper}}{\text{days until decomposition, without copper}} \times 100$ Table 8

| Stabiliser No. | Days until decomposition without Cu | Days until decomposition with Cu | Preservation factor |
|---|---|---|---|
| without additive | 70–95 | <1 | <1 |
| 1 | 95 | 79 | 83 |
| 2 | 126 | 126 | 100 |
| 9 | 104 | 104 | 100 |
| 13 | 74 | 91 | 123 |
| 14 | 102 | 110 | 108 |
| 19 | 128 | 114 | 81 |
| 25 | 104 | 97 | 93 |
| 27 | 98 | 79 | 81 |
| 40 | 104 | 99 | 95 |
| 42 | 89 | 79 | 89 |
| 44 | 94 | 99 | 105 |
| 49 | 113 | 113 | 100 |
| Comparison products | | | |
| 52 | 76 | 13 | 17 |
| 53 | 72 | 1 | 1 |
| 55 | 88 | 4 | 5 |

EXAMPLE 18

The test samples without copper addition described in Examples 16 and 17 were, moreover, tested with respect to their colour stability, as follows:

a. After incorporation (Table 9, Column 2).
b. After heat ageing at 149° C (Table 9, Column 3).
c. After 1 week's treatment with boiling water (Table 9, Column 4).

An empirical colour scale was used for Table 9, whereby 5 denotes colourlessness, 4 a just perceptible, faint discolouration, and 3, 2, 1, <1 denote successively more severe discolouration.

Table 9

| Stabiliser No. | Colour rating according to Scale 1–5 after incorporation | after heat-ageing | boiling H₂O 1 week |
|---|---|---|---|
| without additive | 5 | 4 | 4 |
| 1 | 4–5 | 2 | 4 |
| 8 | 4–5 | 3 | 4 |
| 9 | 4–5 | 2 | 4 |
| 10 | 4 | 2 | 4 |
| 13 | 3–4 | 1–2 | 2–3 |
| 15 | 4 | 1–2 | 4 |
| 16 | 4 | 1 | 3 |
| 25 | 4–5 | 2 | 4–5 |
| 27 | 4 | 2 | 3–4 |
| 30 | 4–5 | 2–3 | 4–5 |
| 31 | 4–5 | 2 | 4–5 |
| 40 | 4 | 2 | 4 |
| 41 | 3–4 | 1–2 | 4 |
| 42 | 4 | 2 | 4 |
| 43 | 3–4 | 2 | 4 |
| 44 | 4 | 2 | 3 |
| 49 | 4 | 2 | 2–3 |
| 50 | 4–5 | 2–3 | 4–5 |
| 51 | 1 | <1 | 2 |
| 52 | 1 | <1 | <1 |
| 53 | <1 | <1 | <1 |
| 54 | <1 | <1 | <1 |
| 55 | 3–4 | <1 | 2 |
| 56 | 3–4 | <1 | 2–3 |
| 57 | <1 | <1 | <1 |

EXAMPLE 19

100 Parts of polypropylene (melt index 3.2 g/10 min., 230° C/2160 g) are intensively mixed for 10 minutes in a shaking apparatus with the additives listed in Table 10, in the given concentrations.

The obtained mixture is kneaded in a Brabender Plastograph at 200° C for 10 minutes; to the mixture is then added 1.0 per cent by weight of powdered copper (electrolytically produced, Merck), and the whole intensively mixed at the same temperature for a further 2 minutes. The thus obtained mass is subsequently pressed in a platen press at 260° C platen-temperature to form 1 mm thick plates, from which are stamped, by means of a stamping tool, strips having a width of 1 cm and a length of 17 cm.

The fully stabilised test samples without copper-addition required for comparison purposes are prepared in an analogous manner.

The testing of the dependence of the effect of the stabilisers on the further additives is carried out by heat ageing in an air-circulation furnace at 149° C. For results see Table 10, Column 4. The furnace-ageing times for the test samples without copper addition, required for comparison, are given in Table 10, Column 3.

Table 10

| Mixture | Additives and concentration (P. = parts) | Furnace ageing times in days at 149° C until commencing decomposition | |
|---|---|---|---|
| | | without copper addition | with copper addition |
| 1 | 0,5 P. Stabiliser 1<br>0,2 P. Additive A | 15 | 8 |
| 2 | 0,5 P. Stabiliser 13<br>0,2 P. Additive B | 25 | 10 |
| 3 | 0,5 P. Stabiliser 30<br>0,1 P. Additive C | 29 | 15 |
| 4 | 0,3 P. Stabiliser 1<br>0,3 P. Additive D | 17 | 9 |
| 5 | 0,4 P. Stabiliser 13<br>0,1 P. Additive E | 15 | 10 |
| 6 | 0,5 P. Stabiliser 30<br>0,05 P. Additive E<br>0,15 P. Additive D | 28 | 23 |
| 7 | 0,4 P. Stabiliser 1<br>0,1 P. Additive B<br>0,3 P. Additive D | 32 | 26 |
| 8 | 0,5 P. Stabiliser 13<br>0,1 P. Additive C<br>0,3 P. Additive D | 45 | 34 |
| 9 | 0,5 P. Stabiliser 1<br>0,1 P. Additive A<br>0,3 P. Additive F | 16 | 12 |

Additives used:
A: 3-(3,5-di-tert.-butyl-4-hydroxyphenyl)-propionic acid-n-octadecylester,
B: 1,1,3-tris-(3'-tert.-butyl-4'-hydroxy-5'-methyl-phenyl)-butane,
C: 1,3,5-trimethyl-2,4,6-tris-(3',5'-di-tert.-butyl-4'-hydroxybenzyl)-benzene,
D: dilaurylthiodipropionate,
E: 3-(3,5-di-tert.-butyl-4-hydroxyphenyl)-propionic acid tetraester of pentaerythrite,
F: tris-(nonylphenyl)-phosphite.

EXAMPLE 20

100 Parts of polypropylene (melt index 3.2 g/10 min., 230+ C/2160 g) are intensively mixed for 10 minutes, in a shaking apparatus, with the additives listed in Table 11, in the given concentrations.

The obtained mixture is kneaded in a Brabender Plastograph at 200° C for 10 minutes; to the mixture is then added 0.1 percent by weight of copper stearate, and the whole thoroughly mixed at the same temperature for a further 2 minutes. The thus obtained mass is subsequently pressed in platen-press at 260° C platen-temperature to form 1 mm thick plates, from which are stamped, with the aid of a stamping tool, strips having a width of 1 cm and a length of 17 cm.

The fully stabilised test samples without the addition of copper stearate, required for comparison purposes, are prepared in an analogous manner.

The testing of the effectiveness of the metal deactivators (stabiliser No. 14) in the tet strips containing copper stearate is performed by heat ageing in an air circulation furnace at 149° C. For results see Table 11, Column 4. The furnace ageing times, required for comparison, for the test samples without addition of copper stearate are given in Table 11, Column 3.

Table 11

| Mixture | Additives and concentration (P. = parts) | Furnace-ageing times at 149° C Days until commencing decomposition | |
|---|---|---|---|
| | | without copper stearate | with copper stearate |
| 1 | 0,2 P. Additive A without metal-deactivator | 15 | <<1 |
| 2 | 0,2 P. Additive A<br>0,5 P. Stabiliser No.14 | 17 | 6 |
| 3 | 0,1 P. Additive B<br>0,3 P. Additive D<br>0,5 P. Stabiliser No.14 | 34 | 24 |

The designation of the additives is the same as in Example 19.

EXAMPLE 21

100 Parts of polypropylene (melt index 3.2 g/10 min., 230° C/2160 g) are intensively mixed, in a shaking apparatus, with 0.1 parts of 3-(3',5'-di-tert.-butyl-4'-hydroxyphenyl)-propionic acid octadecyl ester, 0.3 parts of dilaurylthiodipropionate, and an additive listed in the following Table 12, in the given amount.

The obtained mixture is kneaded in a Brabender Plastograph at 200° C for 10 minutes; to the mixture is then added 1.0 percent by weight of powdered copper (electrolytically produced, Merck), and the whole thoroughly mixed for a further 2 minutes. The obtained mass is subsequently pressed in a platen press, at 260° C platen-temperature to form 1 mm thick plates, from which are stamped, with the aid of a stamping tool, strips having a width of 1 cm and a length of 17 cm.

The testing with respect to the effectiveness of the metal deactivators added to the test strips, as a function of the concentration, is performed by heat ageing in an air circulation furnace at 149° C. The results are given in Table 12.

Table 12

(Given in the table are the days until decomposition commences)

| Stabiliser No. | Amount of added stabiliser | | | | |
|---|---|---|---|---|---|
| | 0 parts | 0.1 parts | 0.2 parts | 0.3 parts | 0.5 parts |
| 1 | <1 | 9 | 14 | 19 | 21 |
| 10 | <1 | 6 | 19 | 23 | 25 |
| 14 | <1 | 7 | 18 | 25 | 29 |
| 25 | <1 | 9 | 19 | 19 | 24 |
| 31 | <1 | 8 | 17 | 20 | 22 |
| 33 | <1 | 12 | 16 | 18 | 19 |
| 40 | <1 | 11 | 15 | 18 | 19 |
| 42 | <1 | 7 | 10 | 15 | 18 |
| 44 | <1 | 9 | 18 | 21 | 24 |

EXAMPLE 22

Stabilisation of asbestos-filled polypropylene.

100 parts of polypropylene ("Carlona", Shell) are intensively mixed together with 65 parts of "Chrysotilasbest" (Montecatini), 0.5 parts of 3-(3,5-di-tert.butyl-4-hydroxyphenyl)-propionic acid octadecyl ester, 1.5 parts of dilaurylthiodipropionate and 0.83 parts of one of the additives listed in the following Table 13.

The resultant mixture is kneaded in a Brabender Plastograph for 10 minutes and then pressed in a platen press at 260° C platen temperature to form 1 mm thick plates, from which are then stamped strips having a width of 1 cm and a length of 17 cm.

The testing for effectiveness of the additives added to the test strips is carried out by heat ageing in an air-circulation furnace at 149° C. The easily visible decomposition of the test strip is taken as being the end point for each test, said decomposition being revealed by the chalking of decomposed material.

The results are given in days.

Table 13

| Stabiliser No. | Days until decomposition |
|---|---|
| without additive | 1.5 |
| 1 | 12 |
| 9 | 10 |
| 15 | 10 |
| 25 | 9 |
| 31 | 11 |
| 33 | 10 |

EXAMPLE 23

100 parts of unstabilised high pressure polyethylene powder ("Plastylene," Ethylene Plastique, Mazingarbe, France) are intensively mixed together in the dry state with 1.0 part of 1,3-bis-(tert.-butyl-peroxyisopropyl)-benzene ("Perkadox 14", Oxydo GmbH, Emmerich, Germany) and 0.2 parts of one of the additives listed in the following Table 14. The mixture is then treated in a friction rolling mill at 110° C for 10 minutes until a homogeneous mass is obtained. The thus produced mixture is subsequently pressed in a platen press at 260° C platen temperature for 20 minutes to form 1 mm thick plates. Under these conditions due to the perioxide which has been added, cross-linking of the polymer occurs. From these plates are then stamped, with the aid of a stamping tool, strips of 10 × 140 mm.

The test strips are then suspended on steel hooks and subjected to heat ageing in an air-circulation furnace at 120° C. After an induction time which is significant for the additive used, the decomposed material drips off; the results are given in days.

Table 14

| Stabiliser No. | Days until dripping starts at 120° C |
|---|---|
| without additive | 6 |
| 1 | 10 |
| 4 | 12 |
| 7 | 10 |
| 12 | 13 |
| 15 | 11 |
| 31 | 12 |
| comparison product | |
| 50 | 8 |

EXAMPLE 24

75 parts of unstabilised polypropylene are intensively mixed together in a shaking apparatus with 0.1 parts of β-(2,3-di-tert.-butyl-4-hydroxyphenyl)-propionic acid octadecyl ester, 0.3 parts of dilaurylthiodipropionate and 0.5 parts of stabiliser No. 1.

The obtained mixture is introduced into a Brabender Plastograph and kneaded at 200° C for 5 minutes and 30 r.p.m. until a homogeneous mass is obtained. Then, within one minute, a mixture of a further 25 parts of polypropylene and 0.1 parts of Co-II-stearate, Fe-II-stearate and Cu-II-stearate respectively, is added. After completion of the addition, kneading is continued at the same temperature and r.p.m. for 10 minutes, the moment of rotation being continuously measured in the form of plastograms. Since the moment of rotation, melting viscosity and molecular weight are correlated with each other in that, under otherwise constant conditions, inxcreased moment of rotation results in an increased melting viscosity and therefore in an increased molecular weight of the polymer, decrease of moment of rotation results in a degradation of the polymer.

The plastograms, required for comparison purposes, of test samples without addition of metal salt and without addition of deactivator and the test samples with metal salt addition and without addition of deactivator are prepared in an analogous manner.

The degradation of the polymer during the kneading period of 10 minutes is expressed by the residual moment of rotation at the end of the kneading period, in percent of the initial moment of rotation (see Table 15, Column 5). The effectiveness of the metal-deactivator results from the comparison of the figures in Column 5 for each metal salt, with and without Stabiliser No. 1.

Table 15

| Metal salt | Stabiliser No. 1 | Moment of rotation in grams | | |
|---|---|---|---|---|
| | | beginning | end | end/beginning × 100 |
| without additive | | 1280 | 1180 | 92% |
| Co-stearate | 0.5% | 1000 | 770 | 77% |
| Co-stearate | — | 1250 | 300 | 25% |
| Fe-stearate | 0.5% | 1000 | 400 | 40% |
| Fe-stearate | — | 1250 | 360 | 29% |
| Cu-stearate | 0.5% | 1250 | 730 | 59% |
| Cu-stearate | — | 1250 | 1000 | 80% |

EXAMPLE 25 a. Preparation of the test samples.

100 parts of unstabilised polybutylene-1 powder are intensively mixed together in a shaking apparatus with 0.1 parts of β-(3,5-di-tert.-butyl-4-hydroxyphenyl)-propionic acid octadecyl ester, 0.3 parts of dilaurylthiodipropionate and 0.5 parts of stabiliser No. 1. The obtained mixture is kneaded in a Brabender Plastograph at 200° C for 10 minutes until a homogeneous mass is obtained; to the mixture is then added 1.0 parts of powdered copper (electrolytically produced), and the whole intensively mixed at the same temperature for a further 2 minutes. The thus produced mass is subsequently pressed during 6 minutes in a platen press at 220° C platen temperature to form 1 mm thick plates from which are then stamped strips 1 cm wide and 14 cm in length. The test samples required for comparison purposes without copper addition are prepared in an analogous manner.

b. Testing

The testing for effectiveness of the metal-deactivator added to the copper-containing test strips is carried out by heat ageing in an air-circulation furnace at 110° C until the first signs of the commencing decomposition of the test samples appear. In each case 3 test strips of each formulation are used, from which the average ageing time is calculated. The test strips containing stabiliser No. 1 do not show any signs of decomposition at a time at which the unstabilised test strips are completely decomposed.

EXAMPLE 26

Polypropylene powder is mixed with 0.5 weight precent of bis-[3-(3,5-di-tert.butyl-4-hydroxyphenyl)propionyl]-adipic acid dihydrazide (stabilizer No. 45) with and without the addition of 0.5 weight percent copper powder. The mixing and the preparation of test strips is carried out as described in example 16a. The heat-stability test is carried out analogously to example 16b at two temperatures, namely 135° C and 149° C. The results are shown in the following table.

| Added Stabiliser | Added Copper | Testing Temperature | Days until Decomposition |
|---|---|---|---|
| No. 45 | 0.5 % | 135° | 72 |
| no stabiliser | 0.5 % | 135° | <1 |
| No. 45 | — | 135° | 154 |
| No. 45 | 0.5 % | 149° | 12 |
| No. 45 | — | 149° | 44 |
| no stabiliser | 0.5 | 149° | <1 |

What we claim is:

1. A process for stabilizing homo- or copolymeric polyolefins, characterised by incorporating into said material from 0.01 to 5 percent by weight, calculated on the material to be stabilized, of a compound of the formula $$R-\overset{O}{\underset{\|}{C}}-NH-NH-\overset{O}{\underset{\|}{C}}\left[X-\overset{O}{\underset{\|}{C}}\right]_n NH-NH-\overset{O}{\underset{\|}{C}}-R'$$

whherein R and R' independently of each other represent an aralkyl group which is substituted in its aryl moiety by one or two alkyl groups having each from 1 to 4 carbon atoms and a hydroxyl group or a phenyl group which is substituted by one or two alkyl groups having each from 1 to 4 carbon atoms and a hydroxyl group and X represents the direct bond, an alkylene radical having from 2 to 8 carbon atoms, a phenylene radical or a naphthylene radical, and n represents 0 or 1.

2. A process as claimed in claim 1, characterised by the use of the stabilizer, wherein R and R' is 3,5-di-tert.-butyl-4-hydroxy-β-phenylethyl or 3,5-di-tert.-butyl-4-hydroxyphenyl.

3. A process as claimed in claim 2 characterised by the use of the compound of the formula (CH₃)₃C–[ring]–CH₂–CH₂–CO–NHNH–CO–(CH₂)₄–CO–NHNH–CO–CH₂–CH₂–[ring]–C(CH₃)₃
with HO– and –OH and (CH₃)₃C / C(CH₃)₃ substituents 4. A process of claim 1, wherein said polyolefin is polypropylene.

5. A composition of a homo- or copolymeric polyolefin containing 0.01 to 5% by weight of the stabilizer of claim 1.

6. A composition of claim 5 wherein said polyolefin is polypropylene.

7. A composition of claim 5, wherein R and R' are 3,5-di-tert-butyl-4-hydroxy-β-phenylethyl or 3,5-di-tert-butyl-4-hydroxyphenyl.

8. A composition of claim 7, wherein the stabilizer is (CH₃)₃C–[ring]–CH₂–CH₂–CO–NHNH–CO–(CH₂)₄–CO–NHNH–CO–CH₂–CH₂–[ring]–C(CH₃)₃
with HO– and –OH and (CH₃)₃C / C(CH₃)₃ substituents

* * * * *